US011257468B2

(12) United States Patent
Croxford et al.

(10) Patent No.: US 11,257,468 B2
(45) Date of Patent: Feb. 22, 2022

(54) USER-MOUNTABLE EXTENDED REALITY (XR) DEVICE

(71) Applicant: Arm Limited, Cambridge (GB)

(72) Inventors: Daren Croxford, Cambridge (GB); Roberto Lopez Mendez, Cambridge (GB)

(73) Assignee: Arm Limited, Cambridge (GB)

(*) Notice: Subject to any disclaimer, the term of this patent is extended or adjusted under 35 U.S.C. 154(b) by 43 days.

(21) Appl. No.: 16/805,407

(22) Filed: Feb. 28, 2020

(65) Prior Publication Data

US 2021/0272533 A1 Sep. 2, 2021

(51) Int. Cl.
*G09G 5/37* (2006.01)
*G06F 3/01* (2006.01)
*H04N 5/33* (2006.01)

(52) U.S. Cl.
CPC .............. *G09G 5/37* (2013.01); *G06F 3/012* (2013.01); *G06F 3/013* (2013.01); *G09G 2320/0271* (2013.01); *G09G 2320/066* (2013.01); *G09G 2320/0613* (2013.01); *G09G 2320/0626* (2013.01); *G09G 2320/0666* (2013.01); *G09G 2340/045* (2013.01); *G09G 2354/00* (2013.01); *H04N 5/33* (2013.01)

(58) Field of Classification Search
None
See application file for complete search history.

(56) References Cited

U.S. PATENT DOCUMENTS

| 2014/0098121 | A1* | 4/2014 | Schillings | G06T 5/003 |
| | | | | 345/589 |
| 2017/0060399 | A1* | 3/2017 | Hough | G06F 3/147 |
| 2017/0340200 | A1* | 11/2017 | Blaha | A61B 3/032 |
| 2019/0223716 | A1* | 7/2019 | Abou Shousha | A61B 3/0091 |

OTHER PUBLICATIONS

Huang et al., "Eyeglasses-free Display: Towards Correcting Visual Aberrations with Computational Light Field Displays", Aug. 2014.
Yang, Sarah, "Vision-correcting display makes reading glasses so yesterday", Berkeley News, Jul. 29, 2014.

* cited by examiner

*Primary Examiner* — Michelle Chin
(74) *Attorney, Agent, or Firm* — EIP US LLP

(57) ABSTRACT

A user-mountable extended reality (XR) device capable of receiving and storing at least one of a plurality of user vision capability profiles. The user-mountable XR device comprises a data processing system configured to process input data representative of an input image to perform a modification of the input image based on performing a selection of a given profile of the at least one of the plurality of user vision capability profiles, thereby generating output data representative of an output image for display by the user-mountable XR device. Also described is a method of controlling such a device.

20 Claims, 4 Drawing Sheets

USER-MOUNTABLE EXTENDED REALITY (XR) DEVICE

BACKGROUND OF THE INVENTION

Field of the Invention

The present invention relates to a user-mountable extended reality (XR) device and a method of controlling the user-mountable XR device. In particular, but not exclusively, the invention relates to a user-mountable extended reality (XR) device that includes a head-mounted display (HMD).

Description of the Related Technology

Extended reality (XR) is an umbrella term used to describe immersive technologies that can merge the physical and virtual world in a manner that extends the reality that humans can experience. XR therefore encompasses augmented reality (AR), mixed reality (MR), virtual reality (VR) and other immersive technologies. An XR device is capable of displaying visual content to a user, such as image, text or video content. XR devices may be used for various purposes, including gaming, engineering and healthcare.

SUMMARY

According to a first aspect of the present disclosure, there is provided a user-mountable extended reality (XR) device capable of receiving and storing at least one of a plurality of user vision capability profiles, wherein the user-mountable XR device comprises a data processing system configured to process input data representative of an input image to perform a modification of the input image based on performing a selection of a given profile of the at least one of the plurality of user vision capability profiles, thereby generating output data representative of an output image for display by the user-mountable XR device.

According to a second aspect of the present disclosure, there is provided a method of controlling a user-mountable extended reality (XR) device, the method comprising: receiving and storing at least one of a plurality of user vision capability profiles; and processing input data representative of an input image to perform a modification of the input image based on performing a selection of a given profile of the at least one of the plurality of user vision capability profiles, thereby generating output data representative of an output image for display by the user-mountable XR device.

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
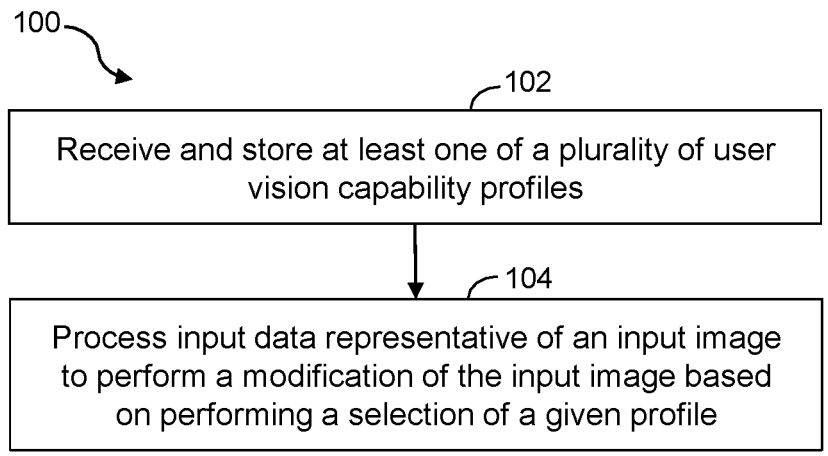
FIG. 1 is a schematic diagram illustrating a method according to examples herein.

FIG. 1 is a schematic diagram illustrating a method 100 according to examples herein. The method 100 of FIG. 1 is used for controlling a user-mountable XR device which is described in more detail in FIG. 5. In examples described herein, the user-mountable XR device may include a head-mounted display.

Item 102 of the method 100 includes receiving and storing at least one of a plurality of user vision capability profiles. Item 104 of the method 100 includes processing input data representative of an input image to perform one or more modifications of the input images based on performing a selection of a given profile of the at least one of the plurality of user vision capability profiles, thereby generating output data representative of an output image for display by the user-mountable XR device.

Receiving and storing the at least one of the plurality of user vision capability profiles on the user-mountable XR device provides a choice of the given user vision capability profile based on which the user-mountable XR device performs the modification of the input image. In this way, one or more modifications of an input image is or are performed specific to the given user vision capability profile. Selecting of the given profile of the at least one of the plurality of user vision capability profiles is described in more detail in FIG. 2.

Embodiments described herein leverage a user vision capability profile. Using a user vision capability profile, the user-mountable XR device may be customized to account for a user's visual issues and/or preferences. A user vision capability profile may cover user vision correction information. In this way, a modification applied to the input image may be based on the user vision correction information associated with the given profile of the at least one of the plurality of user vision capability profiles. The input image may be captured by a camera comprised in the user-mountable XR device as described in more detail in FIG. 5. The camera may face away from the user of the user-mountable XR device. The given profile may comprise at least one user vision correction parameter. The at least one user vision correction parameter may be based on an eye prescription of a user. The eye prescription of the user includes information on the refractive error of the user. As such, the at least one user vision correction parameter may be based on the refractive error of the user. Examples of refractive errors include myopia, hypermetropia, astigmatism and presbyopia. By basing one or more modifications applied to the input image on the eye prescription of the user, the user-mountable XR device can compensate for the user's imperfect visual acuity such that the output image for display by the user-mountable XR device is vision-corrected relative to the input image. For this reason, the user of the user-mountable XR device in this example does not have to wear corrective optics such as eyeglasses or contact lenses when operating the user-mountable XR device. In some examples, the at least one user vision correction parameter may be based on a color deficiency of the user. An example of a color deficiency is red-green color blindness, in which someone with red-green color blindness has difficulty discriminating red and green hues due to a mutation of photoreceptors in the retina. By basing a modification applied to the input image on the color deficiency of the user, the user-mountable XR device can compensate for this visual issue such that the output image has been corrected, relative to the input image, for the color deficiency of the user. In the example that the user is red-green color blind, the output image for display on the user-mountable XR device allows the user to more easily distinguish red and green hues compared to when the same user is not wearing any corrective optics.

Additionally or alternatively, a user vision capability profile may cover user vision enhancement information. In this way, a modification applied to the input image is based on the user vision enhancement information associated with the given profile of the at least one of the plurality of user vision capability profiles. The given profile may comprise at least one user vision enhancement parameter. In this way, a modification performed on the input image is an enhancement to the input image. A user with no visual issues, for which vision correction to the input image is not necessary, will still find use in the user-mountable XR device for the enhanced vision capabilities provided. An example of an enhancement to the input image is a change of the magnification. In this example, the at least one user vision enhancement parameter may be a magnification parameter associated with the user. In this way, the given profile of the at least one of the plurality of user vision capability profiles includes the magnification preferences for the user such that the output image for display by the user-mountable XR device can be aligned to these preferences. Another example of an enhancement to the input image is a change of the contrast of the input image. In this example, the at least one user vision enhancement parameter may additionally or alternatively comprise a contrast parameter associated with the user. In this way, the given profile of the at least one of the plurality of user vision capability profiles includes the contrast preferences for the user such that the output image for display by the user-mountable XR device can be aligned to these preferences. A further example of an enhancement to the input image is a change of the brightness. In this example, the at least one user vision enhancement parameter may additionally or alternatively comprise a brightness parameter associated with the user. In this way, the given profile of the at least one of the plurality of user vision capability profiles includes the brightness preferences for the user such that the output image for display by the user-mountable XR device can be aligned to these preferences.

There are various modifications of the input image that can be performed by the user-mountable XR device. For example, a point spread function (PSF) may be derived using the given profile of the at least one of the plurality of user vision capability profiles. The PSF provides a measure of the degree of blurring of light emitted from a point source introduced by an imaging system when viewed in the image plane. In this case, the imaging system is the user's eye. The one or more modifications of the input image performed by the user-mountable XR device may therefore aim to use the PSF to account for the blurring introduced by the user's eye such that the output image for display is sharper than the input image. This is performed by a deconvolution of the input image with the PSF to correct for the blurring in the input image. In this example, the user vision capability profile will include the information necessary to derive the PSF in order to perform the deconvolution. As such, the one or more modifications of the input image may comprise a deconvolution of the input image with a point spread function (PSF) using the given profile of the at least one of the plurality of user vision capability profiles. A single PSF may be used to correct for both of the user's eyes. Alternatively, the given user vision capability profile may include information to derive a different PSF for each of the user's eyes.

A modification of the input image may comprise a modification of one or more color characteristics of the input image. A color characteristic for example refers to a color appearance parameter of the image, such as a hue, lightness, brightness, chroma, colorfulness and/or saturation of the image. Hue refers to the degree of similarity between a stimulus, and stimuli that are described, respectively, as red, green, blue and yellow. Lightness, sometimes referred to as tone or luminance, refers to the perception of a relative brightness of a color, whereas brightness refers to a perception of an absolute luminance. Chroma refers to the colorfulness of an area as a proportion of a brightness of a similarly illuminated area that appears white. Colorfulness refers to perceived chromatic nature of a color. Saturation refers to the colorfulness of an area judged in proportion to its brightness. Chroma, colorfulness and saturation are based on perception of color attributes and therefore cannot be directly measured but can be quantified based on scales intended to be perceptually even. Modifying the one or more color characteristics of the input image may involve modifying at least one color pixel value of the input image. The color of the output image displayed by the user-mountable XR device may therefore be perceived to be different to the color of the input image that would be perceived if the input image was to be displayed such that the human experience is extended by the user-mountable XR device. In some cases, modifying the one or more color characteristics of the input image involves removing a range of color pixel values of the input image. This may involve configuring a filter to remove the range of color pixel values of the input image corresponding to a certain range of wavelengths of light. In an example where the user is red-green color blind, the difficulty discriminating red and green hues may arise for example from an overlapping response by the photoreceptors to red and green wavelengths of light. By removing the range of color pixel values of the input image corresponding to the range of wavelengths where this overlap occurs, the brain will receive a clearer signal from the photoreceptors in order to distinguish the problem colors. Modifying the one or more color characteristics of the input image may involve graduating one or more colors of the input image. This can include changing a tint or a shade of the input image. A tint represents an extent to which the colors of the image are mixed with white and a shade represents an extent to which the colors of the image are mixed with black. Hence, increasing the tint of an image involves increasing the amount of white in the colors of the image and increasing the shade of the image involves increasing the amount of black in the colors of the image. In this case, graduating one or more colors of the input image involves graduating the tint and/or shade across the display such that the tint and/or shade increases or decreases from one side of the display to another. A user-mountable XR device capable of graduating the tint and/or shade of the input image may be able to dynamically adapt to various lighting conditions in the surrounding environment. Graduating one or more colors of the input image may additionally or alternatively include performing local tone mapping of the input image to increase the contrast in local regions of the input image.

Figure 2:
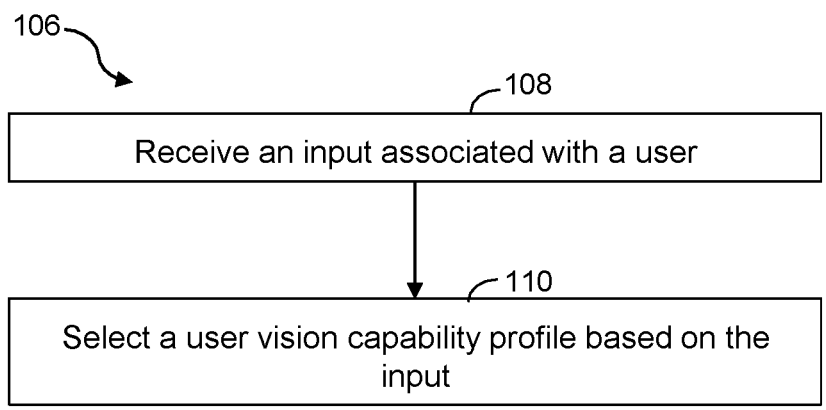
FIG. 2 is a schematic diagram illustrating a method according to examples herein.

FIG. 2 is a schematic diagram illustrating a method 106 according to further examples herein. The method 106 describes a method of controlling the user-mountable XR device to select the given profile of the at least one of the plurality of user vision capability profiles from the at least one of the plurality of user vision capability profiles, thereby to customize the user-mountable XR device for the user relative to a default set up, which may be associated with a default profile, which may be based upon a user without special vision capability customization requirements. Alternatively, a plurality of default profiles may be provided to be selected between, with each based upon different groups of users with varying special vision capability customization requirements. In the examples described herein, a user has a personalized user vision capability profile, different to the or each of these default profile(s).

Item 108 of the method 106 includes receiving a first input associated with a first user. There are various ways by which the user-mountable XR device may receive the first input associated with the first user. For example, a carrier device associated with the first user may communicate with user-mountable XR device providing the first input to the user-mountable XR device. Examples of the carrier device include a smartphone, electronic ticket or a key fob. Example communication channels that may be utilized between the carrier device and the user-mountable XR device include near-field communication (NFC), communication over a cellular network, Wi-Fi or Bluetooth. In another example, the user-mountable XR device may receive the first input associated with the first user without requiring communication with a carrier device. For example, the first user of the user-mountable XR device may provide the first input directly by the first user communicating with a user interface comprised in the user-mountable XR device as described in more detail in FIG. 5. Alternatively, the user-mountable XR device may receive the first input via biometric recognition.

Item 110 of the method 106 involves selecting a user vision capability profile based on the first input, wherein the selected user vision capability profile is a first user capability profile associated with the first user. The selected user vision capability profile may be the user's personalized user vision capability profile or one of a group of default user vision capability profiles. A modification of the input image is performed based on the user's selected user vision capability profile, which in this case is the first user capability profile. The user-mountable XR device is therefore capable of performing one or more modifications of an input image specific to the first user vision capability profile upon receiving an input associated with the first user. By selecting the given user vision capability profile to be the first user capability profile based on the first user input, private information (e.g. an eye prescription of the first user) may only be accessed on the user-mountable XR device by the first user. Receiving an input associated with a different user would not allow for the selection of the given profile associated with the first user. By controlling the user-mountable XR device as in the method 106, the user-mountable XR device is useable by multiple users, but a modification of an input image will be based on the given user vision capability profile associated with the one user of the user-mountable XR device at the given time.

Although not shown in FIG. 2, the method 106 may further include receiving a second input associated with a second user, the second user being different to the first user. In this case based on the second input, the user-mountable XR device will select the given profile of the at least one of the plurality of user vision capability profiles, wherein the given profile of the plurality of user vision capability profiles is a second user vision capability profile associated with the second user.

Figure 3:
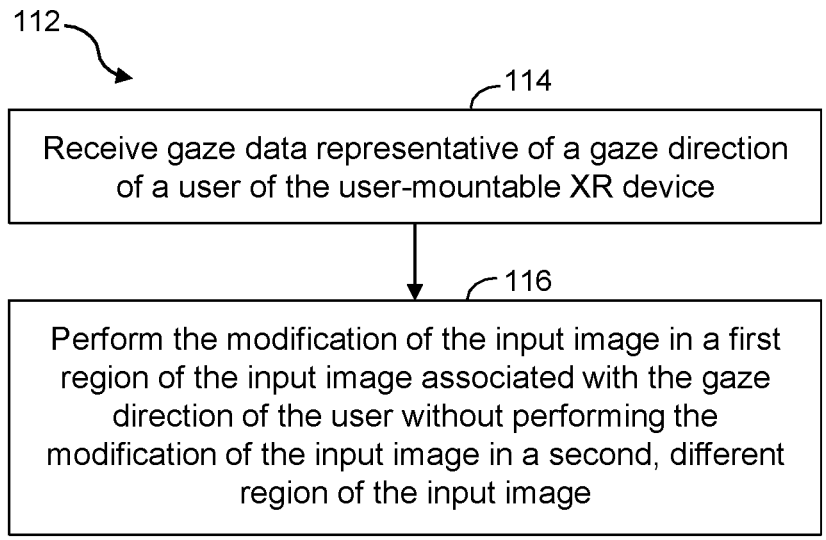
FIG. 3 is a schematic diagram illustrating a method according to examples herein.

FIG. 3 is a schematic diagram illustrating a method 112 according to further examples herein.

Item 114 of the method 112 includes receiving gaze data representative of a gaze direction of the user of the user-mountable XR device. The user-mountable XR device may comprise at least one sensor operable to output the gaze data. In examples, the gaze direction corresponds to a direction in which the user is looking or is focusing on. The gaze data may be obtained and output by at least one eye tracking sensor arranged in the user-mountable XR device as is described in more detail in FIG. 5. In such cases, the gaze data is obtained either directly or indirectly from an eye-tracking mechanism. In other examples, though, the gaze data is not obtained using an eye-tracking mechanism. For example, the gaze data may instead be obtained using a head-tracking mechanism. The gaze data may include data indicating a region of space a viewer is looking at and/or is predicted to be looking at.

In the example of FIG. 3, as well as being based on the given profile of the at least one of the plurality of user vision capability profiles, a modification of an input image is further based on the gaze data representative of the gaze direction of the user of the user-mountable XR device. Item 116 of the method 112 includes performing a modification of the input image in a first region of the input image associated with the gaze direction of the user without performing the same modification of the input image in a second, different region of the input image. In this example, the first region of the input image associated with the gaze direction of the user may be a region that the user is looking or is focusing on and the second region may be the remaining region of the input image that is not included in the first region. As such, the second region of the input image represents a peripheral region of the user's vision, outside the user's fovea. This technique embodied in FIG. 3, known as "foveated rendering" reduces the amount processing required and therefore power consumed when performing the modification of the input image as the input image is only modified in the region of the input image that the user is looking or is focusing on as opposed to the entire input image.

Figure 4:
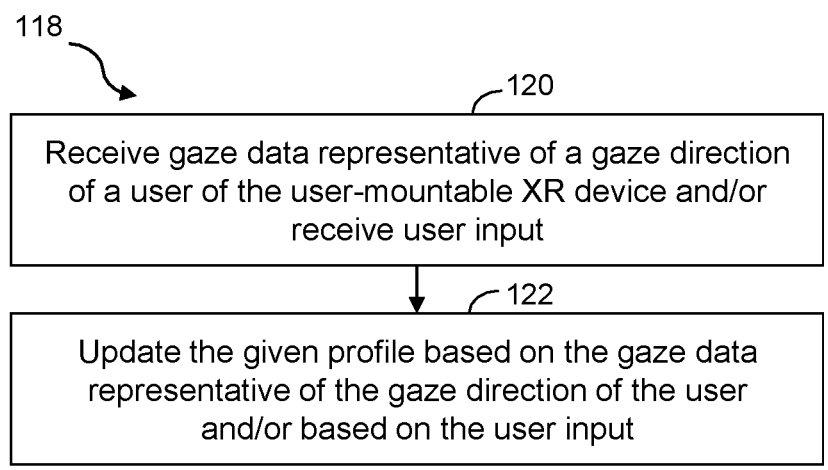
FIG. 4 is a schematic diagram illustrating a method according to examples herein.

FIG. 4 is a schematic diagram illustrating a method 118 according to further examples herein. The method 118 describes a method of controlling the user-mountable XR device to modify the given user vision capability profile selected from the at least one of the plurality of user vision capability profiles. The given user vision capability profile may be the user's personalized user vision capability profile or one of a group of default user vision capability profiles.

Item 120 of the method 118 involves receiving gaze data representative of a gaze direction of a user of the user-mountable XR device and/or receiving user input. The receiving of the gaze data representative of the gaze direction of the user of the user-mountable XR device may be skipped if item 114 of the method 112 according to FIG. 3.

has been performed because the user-mountable device has already received the gaze data in this case. For this reason, the ways in which the user-mountable XR device can receive the gaze data in item 120 of method 118 are the same as those discussed above with reference to item 114 of the method 112 according to FIG. 3. The ways in which the user-mountable XR device can receive user input may be the same as those discussed above with reference to receiving the first input in item 108 of the method 106 according to FIG. 2.

Item 122 of the method 118 involves updating the given user vision capability profile based on the gaze data representative of the gaze direction of the user and/or based on the user input. Examples of updates to the given user vision capability profile include updating the at least one user vision correction parameter and/or the at least one user enhancement parameter as defined above. A user vision capability profile associated with a given user may evolve as the vision capability requirements of the user change with time. The method 118 according to FIG. 4 may be executed periodically or continuously whilst the user-mountable XR device is in use.

There are various embodiments of the method 118 of FIG. 4. For example, the gaze data output by an eye-tracking sensor comprised in the user-mountable XR device may be representative of the time taken by the user to read a given passage of text. In this example, the user-mountable XR device is configured to detect whether the time taken to read a passage of text has increased above a threshold time. If this threshold is exceeded, the user-mountable XR device may be configured to update the given user vision capability profile associated with the user. This may involve a change to the magnification settings associated with the user to aid the user in reading a similar passage of text in the future. A change to the magnification settings associated with the user may comprise changing the magnification parameter associated with the user discussed above. Alternatively, the at least one user vision correction parameter based on the eye prescription of the user may be modified such that the user may perceive a similar passage of text in the future to be sharper such that the time taken to read the given passage of text is reduced below the threshold time.

In another example of the method 118 according to FIG. 4, the modification of the input image performed by the user-mountable XR device may be further based on user data indicative of a user request to modify the input image. The user request may specify the type of modification to perform on the input image in order to generate the output image for display by the user-mountable XR device (e.g. increase magnification or contrast of the input image). This is described in more detail in FIG. 5. In this example, the user input received in item 120 of the method 118 according to FIG. 4 is the user data indicative of the user request to modify the input image. In response to a user request, the user-mountable XR device may be configured to modify the given user vision capability profile. In this way, it may be recognized that the same user request has been used multiple times by the user such as requesting the same magnification of the input image. The given user vision capability profile in this example may be modified such that the magnification settings are amended in line with the repeated user request. This avoids further repeat user requests from the user. Additionally, or alternatively, the user request may directly specify the changes required to the given user vision capability profile associated with the user. In this example, the user of the user-mountable XR device may not have to repeat the same modification requests before a change is made to the given user vision capability profile, instead the given profile is changed with a single request. The modification of the input image or portions of the input image is performed based on user input that can be received in one or more different ways. For example, the user-mountable XR device may receive user input using a head-tracking mechanism. In this example a modification of an input image may be further based on the head movement of the user of the user-mountable XR device. For example, a modification of an input image may include a modification of the magnification. In this case, the head-tracking mechanism may be used to detect the movement of the user's head closer to or further away from an object and modify the magnification accordingly so that the object is easier to see in the output image. The magnification may vary linearly with the movement of the user's head or the magnification may vary non-linearly with the movement of the user's head. In another example, a modification of an input image is further based on the head movement of the user relative to an object in the field of view of the user. In one example, the user input may be received using a head-tracking mechanism. In another example, the user input is received using a depth sensor, or in the alternative a mono-depth convolutional neural network (CNN), which is capable of measuring and outputting data representative of the position of, and therefore movement of, the user relative to the object in their field of view. In another example, the user input is received using an eye-tracking sensor capable of measuring the vergence of the user's pupils. The vergence of the user's pupils may be used to detect the distance between the object and the user so the vergence is useable to measure the movement of the user's head relative to the object in their field of view. Where modification of an input image includes a modification to the magnification, the magnification may vary either linearly or non-linearly with the movement of the user's head relative to the object in the user's field of view.

Figure 5:
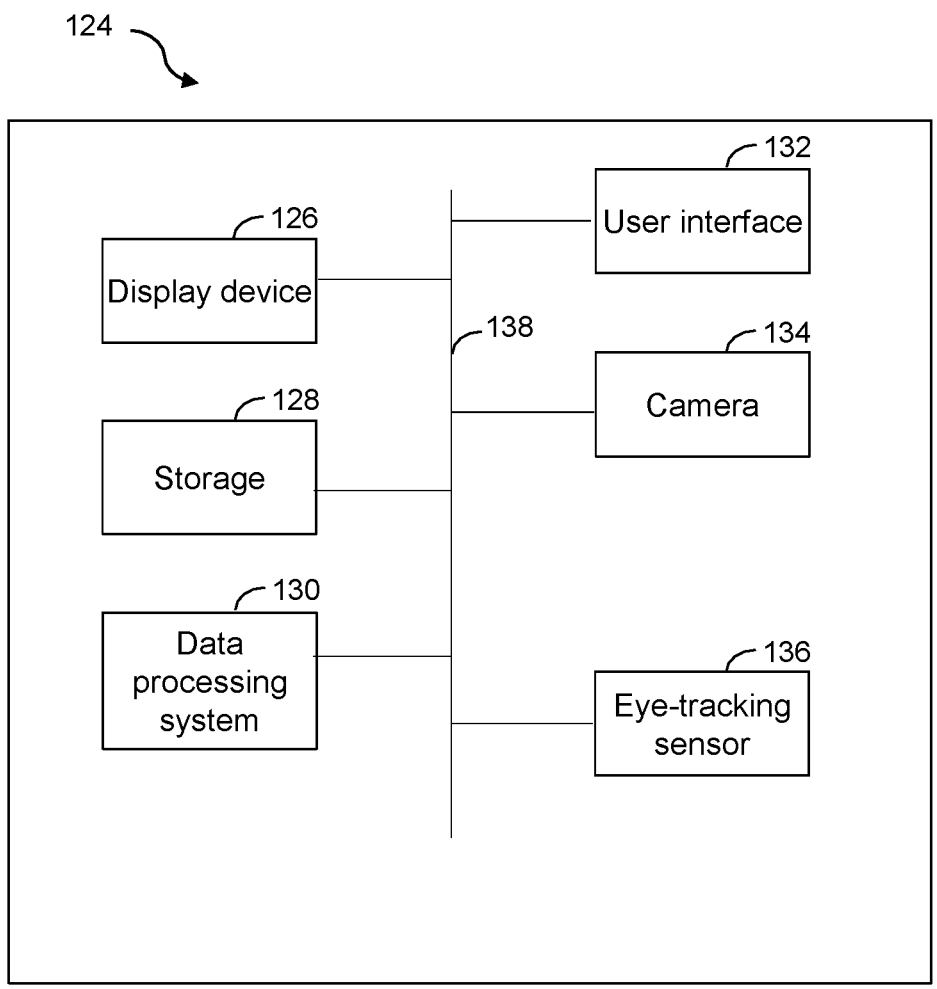
FIG. 5 is a schematic diagram illustrating internal components of a user-mountable extended reality (XR) device according to examples herein.

FIG. 5 is a schematic diagram illustrating internal components of a user-mountable extended reality (XR) device 124 according to examples herein. The user-mountable XR device 124 may be used as the devices 224 and 324 described in FIGS. 6 and 7 respectively, for example, and includes a display device 126. However, in other examples, a device with components similar to or the same as the device 124 of FIG. 5 may be a different type of device including or coupled to a display device, such as a television or other monitor, or a computing device such as a smartphone, tablet or game console.

The display device 126 may be a transmissive display device including a backlight, such as a liquid crystal display device. In other cases, though, a user-mountable XR device similar to the user-mountable XR device 124 may include a transflective display device including a backlight, or a display device without a backlight, such as a display device in which pixels or picture elements of the display device generate light, e.g. an organic light emitting diode (OLED) display device, a retinal projection display device or a plasma display device.

The user-mountable XR device 124 includes storage 128 for storing various data. For example, the storage 128 is configured to store at least one of a plurality of user vision capability profiles. As a result, the user mountable XR device 124 is capable of receiving and storing the at least one of the plurality of user vision capability profiles. In this way, user vision capability profiles may be stored locally on the user-mountable XR device 124 allowing quick access to user information based on which modifications of the input image are performed. The storage 128 may additionally or alternatively store input data related to an input image. The input image may be received from a camera 134 comprised in the user-mountable XR device 124. The input image may alternatively be received from a data processing system 130 that may comprise a graphics processing unit (GPU). The storage 128 may additionally or alternatively store output data representative of an output image for display using the display device 126 as generated in item 104 of method 100 according to FIG. 1. The output data may be received from the data processing system 130. The storage 128 may be random access memory (RAM) such as DDR-SDRAM (double data rate synchronous dynamic random access memory). In other examples, the storage 128 may be or include a non-volatile memory such as read-only memory (ROM), non-volatile memory (NVRAM) or a solid state drive (SSD) such as Flash memory. In this example, the user-mountable XR device 124 may be configured to receive the at least one of the plurality of user vision capability profiles from non-volatile storage comprised in the user-mountable XR device 124. The storage 128 in examples includes further storage devices. The storage 128 may be removable or non-removable from the user-mountable XR device 124. Access to the storage 128 may be controlled by a dynamic memory controller (DMC), not shown in FIG. 5.

The user-mountable XR device 124 also includes a data processing system 130 configured to process input data representative of an input image to perform a modification of an input image based on performing a selection of a given profile of the at least one of the plurality of user vision capability profiles. In other words, the data processing system 130 is configured to perform the item 104 in the method 100 according to FIG. 1 described above. Components of the data processing system 130 may be communicatively coupled via at least one bus, which may have a limited bandwidth. Operations performed by the components of the data processing system 130 may be carried out by hardware and/or software. Each of the components of the data processing system 130 may be implemented using machine readable instructions and suitably programmed or configured hardware, such as circuitry. Each of the components of the data processing system 130 can include a microprocessor, microcontroller, processor module or subsystem, programmable integrated circuit, programmable gate array or other computing device. The components of the data processing system 130 may comprise multiple co-located processors or multiple disparately located processors. In some examples, the data processing system 130 comprises computer-useable volatile and/or non-volatile memory configured to store information and/or instructions for the components of the data processing system 130, which may be considered to correspond to local storage of the data processing system 130. The computer useable volatile and/or non-volatile memory may be coupled with the bus. The computer-useable memory may comprise RAM and/or ROM.

The data processing system 130 may be configured to process the input data representative of the input image to identify an object captured in the input image. The object may by an inanimate object, such as furniture, or a living creature, such as a person. To identify the object, the input data may be processed using an object detection and/or recognition process. In such cases, the data processing system 130 may be configured to implement computer vision (CV) functionality to perform object detection and/or recognition. CV functionality may include other tasks such as motion estimation, scene reconstruction, image recognition or image restoration. In the example where the CV functionality includes performing image recognition, the scene captured in the input image may be analyzed to determine at least one characteristic of the scene. For example, image recognition may be used to determine the presence of text in the input image. In some examples, CV functionality includes performing simultaneous localization and mapping (SLAM). SLAM comprises generating and/or updating a map of an environment whilst simultaneously determining and/or tracking a location of a sensor within the environment. SLAM processing may involve identifying and locating objects in the environment and using those identified objects as semantic "landmarks" to facilitate the accurate and/or efficient mapping of the environment. Performing object detection and/or recognition may involve the use of one or more trained artificial neural networks (ANNs). Using an ANN to perform object detection and/or recognition may increase an accuracy and/or reliability of object detection and/or recognition compared to some known techniques. An ANN may be trained to detect and locate objects in an image, and/or to classify those objects and the relationship between them using a plurality of predefined object classes or types. The identification of the predetermined object may be performed by a CV engine of the data processing system 130, which is a dedicated processor for implementing CV functionality. The CV engine may be comprised by at least one of a central processing unit (CPU), GPU or neural processing unit (NPU) of the data processing system 130 or may be a separate processing component. In other examples, CV functionality is performed by a processor of the data processing system 130 that is not dedicated to CV functionality, such as a CPU or GPU. The data processing system 130 may be configured to implement CV functionality during modification of an input image to perform image segmentation of the input image, thereby extracting an object of interest in the image from the background. In this example, the modifications of the input image described herein may be performed on a segmented portion of the input image without performing the modification or modifications in a non-segmented portion of the input image. An example of a modification of a segmented portion of an input image is to color the segmented portion of the input image with a transparency so the output image displayed by the display device 126 has a transparency around a potential object of interest, effectively highlighting the object to the user as the potential object of interest for further modification. By implementing CV functionality, the input image may be analyzed to determine a characteristic of an object in the input image. A modification of an input image may be further based on the characteristic of the object in the input image. Examples of characteristics of the input image include the distance between the object and the user-mountable XR device 124, the size of the object, the type of object, the brightness of the object and the color of the object.

Although the data processing system 130 is shown to be an internal component of the user-mountable XR device 124, it is to be appreciated that all or part of the processing that may be performed by the data processing system 130 as described above may be performed by a further device external to the user-mountable XR device 124. In this case, the user-mountable XR device 124 will communicate with the further device such that the output image represented by the output data is displayed on the display device 126. The user-mountable XR device 124 and the further device may have integrated or externally-coupled wired networking capabilities. Alternatively, the user-mountable XR device 124 may have integrated or externally-coupled wireless networking capabilities, using communication channels such as Wi-Fi, cellular network or Bluetooth. For example, the further device may be a smartphone. In this example, the smartphone implements CV functionality such as object recognition that would have otherwise been performed by the data processing system 130 internal to the user-mountable XR device 124. The smartphone in this example communicates the output of the processing performed back to the user-mountable XR device 124. This works to reduce the amount of processing performed in the user-mountable XR device 124 for a given input image.

In the example of FIG. 5, the user-mountable XR device 124 also includes a user interface 132 configured to receive user data indicative of a user request to modify the input image. The user interface 132 may be any suitable interface for receiving the user data, such as an interface for receiving tactile input, e.g. a button, a roller or switch. The user interface 132 may additionally or alternatively be based on a user's interaction with virtual interface elements such as a virtual button or virtual wheel. In this case, the user interface 132 may be further configured to process the gaze data representative of the gaze direction of the user as described above to allow the user to interact with the virtual elements using their eyes. In other cases, the user interface 132 may be or include an interface for receiving the user data, such as an input/output (I/O) interface, such as a universal serial bus (USB) connection, a Bluetooth or infrared connection, or a data network, for example a computer network such as the Internet, a local area network, a wide area network, a telecommunications network, a wired network, a wireless network, or some other type of network. In such cases, the user data may be generated remotely from the user-mountable XR device 124 and subsequently received by the user interface 132 of the user-mountable XR device 124. In FIG. 5, the data processing system 130 is configured to process the input data representative of the input image such that a modification of an input image is further based on the user data indicative of a user request to modify the input image as well as being based on the given user vision capability profile selected from the at least one of the plurality of user vision capability profiles. This improves the flexibility of the user-mountable XR device 124 by allowing the user to control the modifications of the input images that are performed, e.g. in response to a change in the user's preferences. This allows the user to control the output image displayed by the display device 126. For example, a user of the user-mountable XR device 124 may request to magnify a portion of the input image, the portion of the input image may contain text that the user would like to magnify so the text is easier to read. The user interface 132 may be further configured to receive a first input associated with the first user as detailed in item 108 of the method 106 according to FIG. 2. In this case, the data processing system 130 may be further configured to perform the item 110 of the method 106 according to FIG. 2. The user interface 130 is therefore useable to select the user vision capability profile associated with a current user of the user-mountable XR device 124 such that the modifications of the input images performed are based on the user vision capability profile associated with the current user. Alternatively, the user interface 130 may be useable to select one of a group of default user vision capability profiles such that the modifications applied to the input images are based on the one of the group of default user vision capability profiles.

In another example, the user interface 130 may be configured to receive a further user vision capability profile for storage as a further one of the plurality of user vision capability profiles. In this way, a new user using a user-mountable XR device such as the user-mountable XR device 124 in FIG. 5 for the first time may add their own personalized user vision capability profile to the plurality of user vision capability profiles. In this example, the user-mountable XR device may be configured to receive at least one further user vision capability profile for storage as a further one of the plurality of user vision capability profiles. When the user-mountable XR device is in use by the new user on subsequent occasions, their personalized user vision capability profile can be received and selected from the plurality of user vision capability profiles. Although we describe receiving the further user vision capability profile in the context of the user interface 130, it may be the case that the further user vision capability profile may be received by methods similar to how the first input associated with the first user was received in item 108 of the method 106 according to FIG. 2.

In the example of FIG. 5, the user-mountable XR device 124 includes a camera 134. The camera 134, which maybe referred to as an image capture device, is operable to obtain still images or moving images (i.e. video) of an ambient environment and is therefore operable to capture an observation of the ambient environment. Data obtained by the camera 134 may be comprised in the input data representative of the input image that is processed by the data processing system 130. In this way, the data processing system 130 is configured to perform a modification of an input image based on the light captured by the camera. In examples, the image captured by the camera 134 is the input image upon which a modification is performed to generate the output image for display. In some examples, the camera is configured to capture at least one of infra-red (IR) or ultra-violet (UV) light. This configuration may be caused by the removal of filters responsible for filtering IR and/or UV light found in existing cameras from the camera 134 comprised in the user-mountable XR device 124. Alternatively, the user-mountable XR device may comprise at least one additional sensor not shown in FIG. 5 that is capable of capturing at IR and/or UV light. As a result, the camera 134 may capture a wider range of the electromagnetic spectrum than simply visible light, the camera 134 capturing both visible light and at least one of IR or UV light. In this case, the data processing system 130 may be configured to perform the modification of the input image based on the at least one of the IR or UV light. The output image displayed by the display device 126 provides the user of the user-mountable XR device with hyperspectral vision as the output image combines information from the visible light and the IR and/or UV light captured by the camera 134. This enables night vision capabilities in the user-mountable XR device. For example, where the user of the user-mountable XR device 124 is in a darker environment, the amount of visible light captured by the user's eyes can be limited making some objects difficult to see. Capturing and processing IR and/or UV light emitted from such objects means the same objects in the output image for display by the user-mountable XR device will be easier to see.

The user-mountable XR device 124 may also include a sensor operable to output gaze data representative of a gaze direction of a user. In the example of FIG. 5, the sensor is an eye-tracking sensor 136. In this case, the eye-tracking sensor 136 forms part of the user-mountable XR device 124. However, in other examples, the eye-tracking sensor 136 is separate from the user-mountable XR device 124. For example, the eye-tracking sensor 136 may be mountable to, but removable from, the user-mountable XR device 124.

The components of the user-mountable XR device 124 in the example of FIG. 5 are interconnected using a systems bus 138. This allows data to be transferred between the various components. The bus 138 may be or include any suitable interface or bus. For example, an ARM® Advanced Microcontroller Bus Architecture (AMIBA®) interface, such as the Advanced eXtensible Interface (AXI), may be used.

Figure 6:
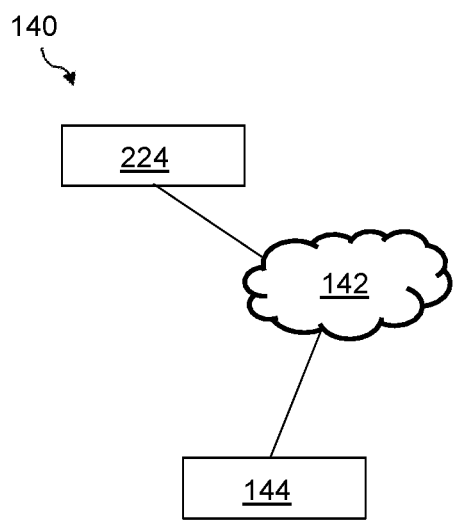
FIG. 6 is a schematic diagram illustrating a network according to examples herein.

FIG. 6 is a schematic diagram illustrating a network 140 according to examples herein. The network 140 includes a user-mountable XR device 224. The network 140 of FIG. 6 also includes external storage 144. The external storage 144 is external to the user-mountable XR device 224. The external storage 144 is configured to store the user vision capability profiles. Examples of the external storage 144 include remote cloud-based storage, local data storage hardware or storage of a further user-mountable XR device.

The user-mountable XR device 224 may communicate with the external storage 144 via a data communications network 142. The data communications network 142 may include private network links and/or public network links and may include a plurality of interconnected networks. In this example, the user-mountable XR device is configured to receive the at least one of the plurality of user vision capability profiles from the external storage 144. By storing the plurality of user vision capability profiles away from the user-mountable XR device 224, the storage requirements for the user-mountable XR device 224 are reduced. For example, user vision capability profiles may be stored in remote cloud-based storage. In this case, the user-mountable XR device 224 may receive the at least one of the plurality of user vision capability profiles by communicating with the remote cloud-based storage, for example using Wi-Fi or via a cellular network. Storing user information in remote cloud-based storage reduces the storage size requirements of the user-mountable XR device. In the case that the external storage 144 includes the storage of a further user-mountable XR device, there is shown to be a synchronization between the two user-mountable XR devices such that user vision capability profiles can be sent between user-mountable XR devices. This offers versatility to a user who can make use of their user vision capability profile on a plurality of user-mountable XR devices.

The user-mountable XR device 224 and the external storage 144 may have integrated or externally-coupled wired networking capabilities. Alternatively, or in addition, the user-mountable XR device 224 and the external storage 144 may have integrated or externally-coupled wireless networking capabilities, using wireless telecommunications systems such as those using the Long-Term Evolution (LTE) standards. The user-mountable XR devices 224 may be connected to one or more networks comprising servers, routers and other networking equipment that communicate using the Internet Protocol (IP) protocol.

Figure 7:
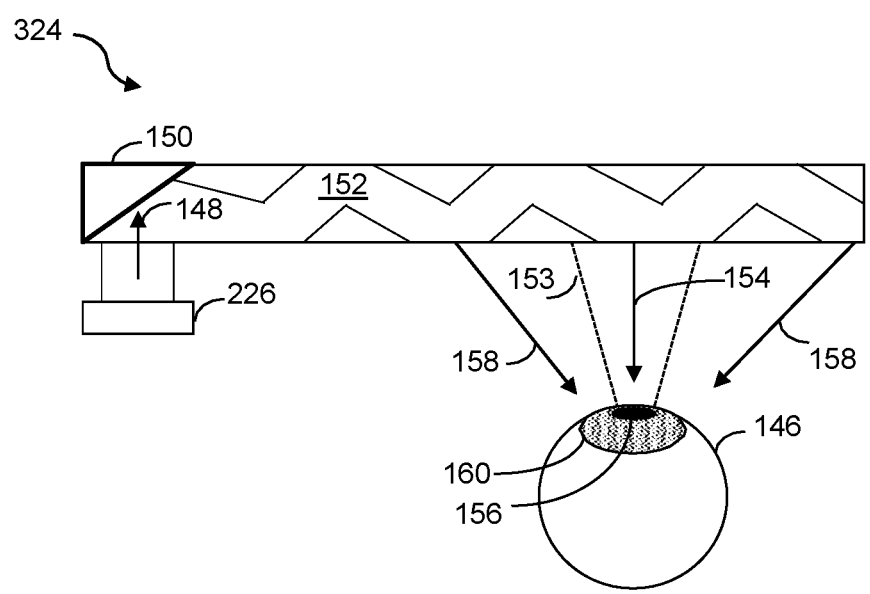
FIG. 7 is a schematic diagram illustrating use of a user-mountable XR device according to examples herein.

FIG. 7 is a schematic diagram illustrating use of a user-mountable XR device 324 according to examples herein. The user-mountable XR device includes a display device 226 for displaying an output image represented by output data generated by a data processing system comprised in the user-mountable XR device. The data processing system may be the data processing system 130 described above in relation to FIG. 5. Although not shown in FIG. 7, it is to be appreciated that the user-mountable XR device 324 may additionally include suitable mounting apparatus, such as a frame and/or strap, for mounting or otherwise coupling the device 324 to the user. In this example, the user-mountable XR device 324 includes a head-mounted display (HMD). For example, the part of the user-mountable XR device 324 shown in FIG. 7 may be integrated in a headset, which may be in the form of a helmet or glasses. Such a headset may be monocular, with the part of the user-mountable XR device 324 shown in FIG. 7 arranged to project an image into one eye of the user, or binocular. Where the headset is a binocular headset, the headset may include one of the parts of the user-mountable XR device 324 shown in FIG. 7 for each eye of the user, i.e. two of the parts shown in FIG. 7 in total. In other binocular headsets, however, the part of the user-mountable XR device 324 shown in FIG. 7 may extend to cover both eyes of the user rather than a single eye 146 shown schematically in FIG. 7.

In the example of FIG. 7, light 148 emanating from the display device 226 during the display of the output image is incident on a prism 150 which refracts the light 148 to direct the light 148 into a waveguide 152. The waveguide 152 guides the light towards the user's eye 146 so that the user can view the image displayed on the display device 226. Various different waveguides may be used as the waveguide 152 of FIG. 7. In some cases, the waveguide is a surface relief waveguide, which includes a plurality of micro-ridges. Light entering the waveguide is incident on a first set of micro-ridges, undergoes internal reflection and is guided along a length of the waveguide. A second set of micro-ridges reflect the light out of the waveguide. In other cases, the waveguide is a holographic waveguide, which includes a plurality of holographic reflective optical elements. A first set of holographic elements reflects incident light and guides the light along the waveguide until the light is incident on a second set of holographic elements, which reflect the light out of the waveguide. In either a surface relief or holographic waveguide, as the light is guided along the length of the waveguide, the light typically undergoes at least one internal reflection within the waveguide, which generally includes a reflective internal surface.

Light 154 incident on the pupil 156 of the user's eye 146 (and therefore visible to the user) is indicated in FIG. 7 with the arrow 154. The user therefore perceives the output image corresponding to the light 154 that is incident on the user's pupil 156. The field of view (FOV) 153 of the user's eye 146 is shown schematically in FIG. 7 and corresponds to a region of space that the user can see using their eye 146.

Not all light emitted by the display device 226 and guided by the waveguide 152 may be incident on the user's pupil 156, however. In the example of FIG. 7, light 158 that is guided towards the user by the waveguide 152 but that is not incident on the user's pupil 146 is shown in FIG. 7 with the arrow 158. The light 158 in the example of FIG. 7 is directed towards the iris 160 of the user's eye. The light 158 may also be incident on other parts of the user and/or other objects on the same side of the user-mountable XR device 324 as the user. The parts of the output image corresponding to the light 158 that does not impinge on the user's pupil 156 are not visible to the user.

In some examples, the waveguide 152 is at least partially transparent. In such cases, the user-mountable XR device 324 may be used as an AR device 324, in which an image displayed by the display device 226 (which is typically a computer-generated image, which may be referred to as a virtual image) is superimposed on the user's view of the real world. In this case, the displayed image obscures part of the environment in the user's vision. However, the remainder of the environment is at least partially visible to the user, through the at least partially transparent waveguide 152 of the user-mountable XR device 324.

Further examples are envisaged. In the examples described above with reference to FIG. 5, the data processing system 130 may be configured to perform a modification of an input image based on the at least one of the IR or UV light, the IR and/or UV light having been captured by the camera 134. This could be used by a user of the user-mountable XR device 124 in a dark environment for example where the amount of visible light captured by the user's eyes can be limited making some objects difficult to see. However, in other examples, the data processing system may alternatively or additionally implement CV functionality as described above with reference to FIG. 5 in order to improve the visibility of objects to the user in darker environments. In this example, an ANN is used to perform object detection and/or recognition to detect and locate objects in an input image captured in a dark environment. Training data of this ANN comprises images of the same objects but captured in a brighter environment. As a result, the image of an object captured in a bright environment may be overlaid on the display device 126 on top of the object in the input image captured in a dark environment. This makes objects in dark environments easier to see for the user without necessarily capturing the IR and/or UV light emitted from the objects. Additionally, or alternatively, a modification of an input image may be to increase the brightness and/or increase the contrast of the input image to improve the visibility of objects in the image. These examples may be performed in response to the user-mountable XR device 124 detecting that the user of the user-mountable XR device 124 is in a dark environment and for this reason, may not require user input.

Further examples of the processing of the input data representative of the input image to perform a modification of an input image are envisaged. For example, a given portion of an input image may be dimmed for display by polarizing the given portion of the input image. Although not shown in FIG. 5, the user-mountable XR device 124 may make use of a polarizing filter to achieve this, the polarizing filter being configured to selectively filter light emitted by the display device 126, based on the input data.

Some examples of information based on which the user-mountable XR device performs modification of an input image to generate the output image for display are provided. For example, the user-mountable XR device may be capable of analyzing user-related information and performing modifications of the input image as appropriate. Examples of user-related information include information regarding where the user is looking or specifically the object that the user is looking at. In another example, the user-mountable XR device may be capable of analyzing object-related information and performing modifications of input images as appropriate. Examples of object-related information include the size of the object or text in the input image, the brightness of the object and the colors of the object.

Although not shown in FIG. 5, the user-mountable XR device 124 may comprise a depth detector configured to output depth information representative of a distance to objects in an ambient environment. The depth detector may be a time of flight (ToF) sensor. The depth detector may additionally be used as a radar with gesture tracking capabilities. Tracking the gestures of a user of the user-mountable XR device provides another way in which the user can interact with the device. Alternatively, the data processing system 130 described in relation to FIG. 5 may be configured to generate depth information from single images by implementing CV functionality, for example using a mono-depth convolutional neural network (CNN) which may be seen as the depth detector in this case. In this example, an additional sensor is not required to generate the depth information. Depth information is useable by the user-mountable XR device to bring added realism to XR experiences.

It is to be appreciated that the data processing system 130 may be configured to trigger a corrective action, based on analysis of a user's response to the output image, in response to determining that the given user vision capability profile associated with the user is unsuitable for the user. For example, the eye-tracking sensor 136 in FIG. 5 may be configured to analyze at least one of the user's pupils, for example by analyzing a captured image of a pupil using a neural network. In this way, the eye-tracking sensor 136 can analyze the reaction of the pupil to the displayed output image. This may include analyzing signals indicating a level of effort made by the eye when viewing the output image or changes to the activity of the eye if the brightness of the display is too high or too low. An example of the corrective action triggered by the data processing system 130 is to issue a visual and/or audible alert to the user about their profile being unsuitable for them, via the user-mountable XR device. This alert may include a recommendation that the user visits an eye doctor to see if there is an issue. Another example of the corrective action triggered by the data processing system 130 is to modify the images differently to a series of alternative test settings in order to find a better set of settings for the user, based on the analysis of the user's eye pupil. The resulting amended profile may be stored as the user vision capability profile associated with the user.

It is to be understood that any feature described in relation to any one example may be used alone, or in combination with other features described, and may also be used in combination with other features of any other of the examples, or any combination of any other of the examples. Furthermore, equivalents and variations not described above may also be employed without departing from the scope of the accompanying claims.

What is claimed is:

1. A user-mountable extended reality (XR) device capable of receiving and storing at least one of a plurality of user vision capability profiles, wherein the user-mountable XR device comprises a data processing system configured to process input data representative of an input image to perform a modification of the input image based on performing a selection of a given profile of the at least one of the plurality of user vision capability profiles, thereby generating output data representative of an output image for display by the user-mountable XR device.

2. The user-mountable XR device according to claim 1, wherein the user-mountable XR device is configured to:
receive an input associated with a user; and
perform the selection of the given profile based on the input, wherein the given profile is a user vision capability profile associated with the user.

3. The user-mountable XR device according to claim 1, wherein the user-mountable XR device is configured to receive the at least one of the plurality of user vision capability profiles from storage external to the user-mountable XR device.

4. The user-mountable XR device of claim 3, wherein the storage external to the user-mountable XR device comprises storage of a further user-mountable XR device, and the user-mountable XR device is configured to synchronize user vision capability profiles between devices.

5. The user-mountable XR device according to claim 1, wherein the user-mountable XR device is configured to receive the at least one of the plurality of user vision capability profiles from non-volatile storage comprised in the user-mountable XR device.

6. The user-mountable XR device according to claim 1, wherein the user-mountable XR device is configured to receive at least one further user vision capability profile for storage as a further one of the plurality of user vision capability profiles.

7. The user-mountable XR device according to claim 1, wherein the modification of the input image is further based on gaze data representative of a gaze direction of a user of the user-mountable XR device.

8. The user-mountable XR device according to claim 7, wherein the modification of the input image is performed in a first region of the input image associated with the gaze direction of the user without performing the modification of the input image in a second, different region of the input image.

9. The user-mountable XR device according to claim 1, wherein the modification of the input image is further based on head movement of a user of the user-mountable XR device relative to an object in a field of view of the user.

10. The user-mountable XR device according to claim 1, wherein the given profile comprises at least one user vision correction parameter, the at least one user vision capability parameter being based on at least one of: a refractive error of a user or a color vision deficiency of the user.

11. The user-mountable XR device according to claim 1, wherein the data processing system is configured to trigger a corrective action, based on analysis of a user's response to the output image, in response to determining that the given profile is unsuitable for the user.

12. The user-mountable XR device according to claim 1, wherein the given profile comprises at least one user vision enhancement parameter, the at least one user vision enhancement parameter comprising at least one of: a magnification parameter associated with a user, a contrast parameter associated with the user or a brightness parameter associated with the user.

13. The user-mountable XR device according to claim 1, wherein the modification of the input image is further based on a characteristic of an object in the input image.

14. The user-mountable XR device according to claim 1, wherein the modification of the input image comprises a deconvolution of the input image with a point spread function derived using the given profile.

15. The user-mountable XR device according to claim 1, wherein the modification of the input image comprises a modification of one or more color characteristics of the input image.

16. The user-mountable XR device according to claim 15, wherein the modification of the one or more color characteristics of the input image comprises at least one of: a modification of at least one color pixel value of the input image, a removal of a range of color pixel values of the input image or a graduation of one or more colors of the input image.

17. The user-mountable XR device according to claim 1, the user-mountable XR device comprising at least one of:
 a camera configured to capture at least one of infra-red or ultra-violet light, wherein the modification of the input image is based on the at least one of the infra-red or ultra-violet light; or
 a depth detector configured to output depth data representative of a distance between an object and the user-mountable XR device, wherein the modification of the input image is based on the depth data.

18. A method of controlling a user-mountable extended reality (XR) device, the method comprising:
 receiving and storing at least one of a plurality of user vision capability profiles; and
 processing input data representative of an input image to perform a modification of the input image based on performing a selection of a given profile of the at least one of the plurality of user vision capability profiles, thereby generating output data representative of an output image for display by the user-mountable XR device.

19. The method according to claim 18, comprising updating the given profile based on gaze data representative of a gaze direction of a user.

20. The method according to claim 18, comprising updating the given profile based on user input.

* * * * *